Patented May 26, 1936

2,042,055

UNITED STATES PATENT OFFICE 2,042,055

PROCESS OF SWEETENING SOUR HYDROCARBON OIL

Charles O. Hoover, San Antonio, Tex., assignor to Bennett-Clark Co., Inc., San Antonio, Tex., a corporation of Texas No Drawing. Application February 24, 1932, Serial No. 594,965

4 Claims. (Cl. 196—33)

The present invention relates to a process for treating "sour" mineral oils, mineral oil distillates and other mineral oils of low boiling point to sweeten them.

According to the well known and commonly used method of treating "sour" mineral oils, mineral oil distillates, and other low boiling mineral oils, the said oils are intimately mixed or agitated with the so called "doctor solution" or "plumbite solution" which is a solution of lead oxide or litharge in a water solution of sodium hydroxide. The lead in this solution is generally considered at present as being in the form of sodium plumbite ($Na_2PbO_2$). If upon treatment with doctor solution, a precipitate of sulphur compounds is not formed, elemental sulphur is added which causes a precipitate to be formed, which precipitate is generally considered in the main to be lead sulphide (PbS). The usual practice is to intimately contact the sour oil with doctor solution, and then to add elemental sulphur to the oil and intimately mix or agitate. In some instances the correct amount of sulphur may be dissolved in the oil to be treated or added thereto before treatment with the doctor solution. The chemical reactions which are considered as occurring may be represented by the following equations, in which the sour constituents are indicated as mercaptans, as these are considered by the authorities and prior art as being the bodies which make the oils sour, and in which the mercaptans are indicated by the general formula RSH in which latter formula R represents any organic radical; the letter S denotes sulphur and the formula $Na_2PbO_2$ denotes the doctor solution or sodium plumbite, and NaOH represents sodium hydroxide:

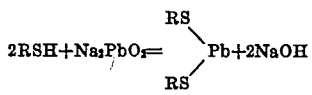

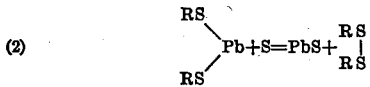

The formula

represents in general the lead mercaptides obtained by treatment with doctor solution. According to the above described process now known and in use the lead mercaptides are decomposed by sulphur according to Equation (2) above, and lead sulphide (PbS) and organic disulphides of the general formula RS—SR are produced. This action of sulphur is usually referred to in the art as breaking out the lead.

The above described process of the prior art has among its objections the fact that elemental sulphur, usually in solution in naphtha or gasolene must be added to the oil in correct proportion in order to break out the lead sulphide. Very frequently also the lead sulphide is formed very slowly, and difficulties in settling out the insoluble lead sulphide or other insoluble lead compound from the oil on treatment with sulphur is also frequently experienced. The sulphur added to the oil should be in proper proportion because it is desirable to carefully guard against the addition of an excess sulphur, since sulphur present in oil is objectionable and also the presence of sulphur increases the corrosion and if present in too large proportion gives a bad corrosion test. In actual practice it is usually found that more sulphur than the theoretical amount is required to produce a satisfactory breaking out of the lead, and this excess will increase the total sulphur content of the oil treated. It will thus be seen that the addition of sulphur to break out the lead must be carefully controlled. Among the objects of the present invention is the overcoming of all the above mentioned objections to the use of sulphur.

According to the present invention the sour oil, such as sour naphthas, gasolenes, water whites or kerosene etc. is treated with doctor solution in the usual manner. In this treatment the oil is intimately contacted or mixed with doctor solution, a solution of litharge in sodium hydroxide as above described. The lead mercaptides formed as a result of the treatment with doctor solution will dissolve in the oil treated, imparting thereto usually a pale yellow or a pale greenish yellow color. Instead of treating with elemental sulphur, as in former processes to break out the lead as lead sulphide, the treated oil with the dissolved lead mercaptides is decanted from the aqueous residue of the doctor solution, or is separated otherwise therefrom in any suitable manner. The so treated oil is then intimately agitated or mixed with dry fuller's earth, absorbent clay, or other adsorbent or absorbent material capable of removing or absorbing the lead mercaptides from the oil. The absorbent material extracts from the oil the lead mercaptides from solution in the oil, or at any event causes their presence to disappear, leaving the oil sweet to doctor solution or the doctor test and nonreactive to elemental sulphur. After the treatment with the adsorbent, for example, the fuller's earth, absorbent clay etc., the adsorbent is separated from the oil in any suitable manner, for example by allowing the adsorbent to settle and drawing off the oil, or by filtering the oil and adsorbent mixture, or by a combination of these methods of separation.

Instead of intimately mixing the oil with the clay or other adsorbent or absorbent as above described, the oil, after treatment with the doctor solution, may be passed through a bed of clay or through clay layers deposited on the leaves of a filter press of suitable thickness to afford sufficient length of contact between the adsorbent and oil to permit the adsorbent to take up or eliminate the lead-sulphur compounds or mercaptides.

The composition of "doctor solution" and its method of preparation and use is well understood in the art, and further details in relation thereto over what is given above is not believed to be necessary. Any standard work on the subject may be consulted for further details regarding its composition, methods of preparation and use. For example, see Technical Paper No. 323-B of the Bureau of Mines, Technical Paper 323-A of the Bureau of Mines; Chemical and Metallurgical Engineering May 19, 1924, pages 785-787; Industrial and Engineering Chemistry, volume 18, No. 7, page 733, July 1926. The amount of doctor solution and adsorbent to be employed in practicing the present invention, as will be understood by the person skilled in the art, will vary with the degree of sourness of the oil to be treated and can be readily ascertained by the person skilled in the art by trial or preliminary tests. The amount of doctor solution to be employed in the present invention is the same as is used in practicing the doctor or plumbite treatment of oils when using sulphur to break out the lead, and can be ascertained in the same manner. As the lead-sulphur bodies remaining in the oil after treatment with doctor solution, usually impart some coloration, usually a yellow or pale yellow or yellowish green color, the disappearance of the color from the oil may be taken as the index when sufficient adsorbent has been used or as the index when the oil has been long enough in contact with the adsorbent. This index may be supplemented by adding to a test portion of the oil, after treatment with the absorbent or adsorbent some elemental sulphur which will cause lead to break out as a precipitate if the mercaptides have not wholly disappeared.

The process of the present invention may be employed either before or after the usual sulphuric acid treatment of gasolenes, naphthas, kerosenes etc. It is preferably employed, however, after the removal of hydrogen sulphide from the oil treated, which hydrogen sulphide is usually removed by intimately contacting or mixing the oil with sodium hydroxide in water solution.

The fuller's earth, absorbent clay or other absorbent or adsorbent used in the process is preferably used in the form of a fine dry powder. Active carbon, silica gel and bentonite may be used as the absorbent.

It will be seen from the foregoing description that the present invention utilizes a material like plumbite solution to form soluble mercaptides in the oil, which mercaptides are then brought in contact with an absorbent material.

The present invention in contrast to the usual doctor sweetening of oils, above described, does not contemplate the addition to the oil of elemental sulphur, usually in finely divided form or in solution, to break out the lead, as the present invention dispenses with the addition of sulphur and substitutes therefor an adsorbent or absorbent without purposely breaking out the lead in the form of a precipitate by the action of sulphur. In some instances the sour oil may contain sufficient sulphur to cause some breaking out of lead upon treatment with the doctor or plumbite solution, and in that event the remainder of the lead-sulphur compounds or mercaptides in the oil are removed according to the present invention. The elemental sulphur or sulphur present in a sour oil causing breaking out of lead when the sour oil is agitated with doctor or plumbite solution may be first separated, for example by distillation, from the oil to be treated before subjecting the oil to the process of the present invention.

In practicing the process of the present invention air or oxygen may be intimately mixed into the oil before or at the time it is brought in contact with the absorbent clay or other absorbent so that oxygen will be present with the adsorbent during the latter's action. Thus the action of the absorbent may be supplemented by the presence of oxygen, the presence of oxygen enhancing the action of the adsorbent.

The adsorbent, for example the fuller's earth etc., after it has been used in accordance with the present invention, and separated from the oil, when agitated with a water solution of caustic alkali, such as sodium hydroxide, either with or without agitation or admixture of air, results in a liquid, after allowing the clay to settle or filtering out the clay, which is also capable of sweeting sour oils of the kind indicated above, which liquid is regenerated doctor solution.

Sour oils treated in accordance with the present invention are doctor sweet to ordinary doctor solution as described above, and have good color.

The process of the present invention may be practiced upon the sour oils at ordinary temperature or the oils may be heated. However, any heating must not be to such a temperature or for such duration of time as to wholly decompose the mercaptides, since if the mercaptides are wholly decomposed, there would be no mercaptides present for contact or reaction with the adsorbent material.

Instead of forming the lead mercaptide in the sour oil by the use of a solution of litharge in caustic alkali, the sour oils may be brought into contact with a mixture of litharge and solid sodium hydroxide, about in the proportions to form sodium plumbite. This mixture may be employed with the addition of solid calcium hydroxide up to about 25% of the mixture. These mixtures are preferably employed in powder form with a water content amount from about 10 to 30% of the mixture.

Having described the present invention in detail as required by the statutes, I claim:

1. The process of sweetening sour hydrocarbon oil which comprises contacting the oil with a lead compound forming organic lead sulphur compounds with the sour constituents of the oil and thereafter contacting the oil containing the said compounds with an adsorbent material in the presence of added oxygen.

2. The process of sweetening sour mineral oil which comprises contacting the sour mineral oil with a compound of lead forming organic lead sulphur compounds with the sour constituents of the oil, and thereafter while the oil is out of contact with the said compound of lead, and while the oil contains organic lead sulphur compounds, contacting the oil with an adsorbent material in the presence of added oxygen.

3. The process of sweetening sour mineral oils which comprises reacting upon the sour constituents of the oils with an aqueous solution of a metal compound forming mercaptides with sour constituents of the oil, and thereafter, in a separate step, and while the oils contain mercaptides, contacting the said oils with an adsorbent material in the presence of added oxygen.

4. The method of desulphurizing hydrocarbon oils including the steps of contacting the hydrocarbon oils with an aqueous solution of a mercaptide forming metal salt to form metal mercaptides and removing the metal mercaptides as such by adsorption with an activated carbon.

CHARLES O. HOOVER.